United States Patent
Kobayashi et al.

[11] Patent Number: 5,804,285
[45] Date of Patent: Sep. 8, 1998

[54] DECORATIVE SHEET AND METHOD FOR PRODUCING THE SAME

[75] Inventors: Toshitake Kobayashi; Yoshiaki Netsu, both of Tokyo-To, Japan

[73] Assignee: Dai Nippon Printing Co., Ltd., Japan

[21] Appl. No.: 491,671

[22] Filed: Jun. 19, 1995

[30] Foreign Application Priority Data

Jun. 21, 1994 [JP] Japan ................................ 6-160718

[51] Int. Cl.⁶ .............................. B32B 3/00; B32B 31/00
[52] U.S. Cl. ...................... 428/172; 428/143; 428/147; 428/161; 428/162; 428/167; 428/201; 428/207; 428/542.2; 156/196; 156/219; 156/277
[58] Field of Search ................................... 428/156, 172, 428/207, 161, 162, 163, 167, 141, 143, 147, 201, 542.2; 156/279, 196, 219, 228

[56] References Cited

U.S. PATENT DOCUMENTS

| | | | |
|---|---|---|---|
| 5,270,097 | 12/1993 | Amemiya et al. | 428/156 |
| 5,284,693 | 2/1994 | Spain et al. | 428/156 |
| 5,429,857 | 7/1995 | Amemiya et al. | 428/156 |

FOREIGN PATENT DOCUMENTS

| | | |
|---|---|---|
| 4-64443 | 2/1992 | Japan . |
| 2229965 | 10/1990 | United Kingdom . |

*Primary Examiner*—Donald Loney
*Attorney, Agent, or Firm*—Parkhurst, Wendel & Burr, L.L.P.

[57] ABSTRACT

A printed woodgrain pattern and a lustrous solid printed layer are formed by printing on the back surface of a transparent thermoplastic resin film to obtain a printed film. The printed film and a colored thermoplastic resin film are superposed, the printed film and the colored thermoplastic resin film are laminated to obtain a laminated structure and, at the same time, the laminated structure is embossed from the side of the colored thermoplastic resin film by a doubling embossing method with an embossing die provided with an embossing pattern of ridges and furrows to obtain a decorative sheet. In the decorative sheet, a second and a third embossed pattern each having a cross section having a smooth outline expressed by a periodic function or a pseudo-periodic function are formed in the interfaces between the colored thermoplastic resin film and the lustrous printed layer and between the lustrous printed layer and the transparent thermoplastic resin film, respectively.

11 Claims, 7 Drawing Sheets

DECORATIVE SHEET AND METHOD FOR PRODUCING THE SAME

BACKGROUND OF THE INVENTION

1. Field of the Invention

The present invention relates to a decorative sheet having a solid appearance resembling that of natural wood or fabric and embossed woodgrain or fabric texture surfaces showing an improved lustrous pattern that varies depending on its orientation relative to a light source or direction of view, and a method for producing the same.

2. Description of the Related Art

Embossing a decorative sheet to improve the ornamental appearance of the decorative sheet has been generally practiced. An embossed thermoplastic resin sheet is one of such embossed decorative sheets. In one form of a decorative sheet fabricating method disclosed in Japanese Patent Laid-open (Kokai) No. 4-64443, a lustrous, solid printed layer and a printed pattern layer are formed in that order on a colored polyvinyl chloride film, a protrusions and depressions pattern of hair lines and curved lines is embossed on the coated surface of the colored polyvinyl chloride film, and then the embossed surface is coated with a transparent thermoplastic resin film by dry lamination or with a transparent paint coating to complete a decorative sheet. In another form of this prior art decorative sheet producing method, a pattern layer and a lustrous solid printed layer are formed on a back surface of a transparent thermoplastic resin film and the transparent thermoplastic resin film is embossed.

A decorative sheet producing method disclosed in Japanese Patent Laid-open (Kokai) No. 3-8477 forms a printed woodgrain layer, a lustrous solid printed layer and a solid printed layer of a covering colored ink on one surface, on which a raised protrusions and depressions pattern of wavy lines is formed, of a transparent base sheet to produce a luster inherent to a woodgrain plate or fabric texture.

The appearance of embossed decorative sheets is liable to be spoiled by the deposition of dust and foreign matters in depressions formed in the embossed surface and there is the possibility that the raised patterns are abraded or damaged.

The design of a decorative sheet produced by coating the surface of a colored polyvinyl chloride film with a lustrous solid printed layer and a printed pattern layer, embossing the coated surface of the colored polyvinyl chloride film and coating the embossed surface with a transparent thermoplastic resin film by dry lamination or with a transparent paint coating does not have deep appearance because the lustrous solid printed layer underlies the printed pattern layer. Since the ridges and furrows of an embossing die plate formed by an ordinary process, such as an engraving process or an etching process, have each a cross section of an outline having sharp corners, such as rectangular corners, the protrusions and depressions of the lustrous solid printed layer that reflects light have rectangular cross sections and, consequently, the luster of the decorative sheet is different from that of natural wood or fabric and unsatisfactory.

SUMMARY OF THE INVENTION

The present invention has been made to solve those problems in the prior art decorative sheet fabricating methods and it is therefore an object of the present invention to provide an elegant woodgrain decorative sheet of an excellent design, exhibiting a luster resembling that of natural wood and having a realistic texture, and a method for producing the same.

In a first aspect of the present invention, a decorative sheet comprises a transparent thermoplastic resin film having a back surface provided with a printed pictorial pattern, a lustrous layer formed on a back surface of the transparent thermoplastic resin film, and a colored thermoplastic resin film on a back surface of the bright layer. In this decorative sheet, a first, a second and a third embossed pattern are formed in a back surface of the colored thermoplastic resin film, in a interface between the colored thermoplastic resin film and the bright layer, and in an interface between the bright layer and the transparent thermoplastic resin film, respectively, respective outlines of cross sections of the second and the third embossed pattern formed respectively in the interface between the colored thermoplastic resin film and the bright layer and in the interface between the bright layer and the transparent thermoplastic resin film are composed of smooth curves expressed by periodic functions or pseudoperiodic functions, respectively.

In a second aspect of the present invention, a decorative sheet producing method comprises the steps of sequentially forming a printed pictorial pattern and a bright layer in this order on a back surface of a transparent thermoplastic resin film, superposing a colored thermoplastic resin film to a back surface of the bright layer, and simultaneously forming a first embossed pattern in a back surface of the colored thermoplastic resin film, and a second and a third embossed pattern each having a cross section having a smooth outline expressed by a periodic function or a pseudoperiodic function in the interfaces between the colored thermoplastic resin film and the bright layer and between the bright layer and the transparent thermoplastic resin film, respectively, with an embossing die (plate).

According to the present invention, a decorative sheet can have a pattern of an excellent design and a deep luster resembling that of natural wood or fabric and harmonious with the grain or fabric texture, which are incomparable with those of the conventional decorative sheets, and the lustrous regions move according to orientation of the surface of the decorative sheet relative to a light source or the direction of view providing the decorative sheet with an elegant, realistic woodgrain or fabric texture appearance.

The above and other objects, features and advantages of the present invention will become more apparent from the following description taken in connection with the accompanying drawings.

DETAILED DESCRIPTION OF THE PREFERRED EMBODIMENTS

Figure 1:
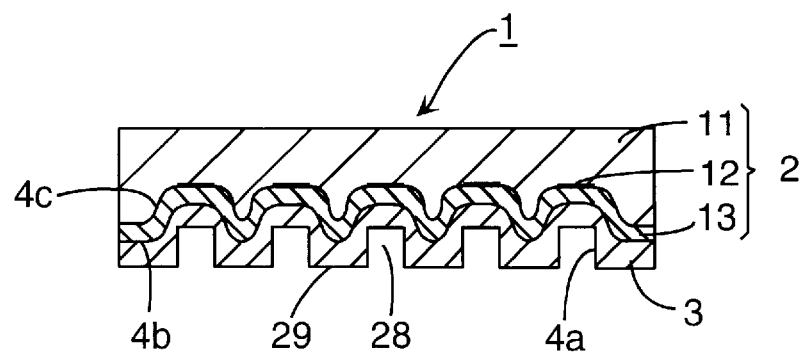
FIG. 1 is a sectional view of a decorative sheet in a first embodiment according to the present invention.
Figure 2:
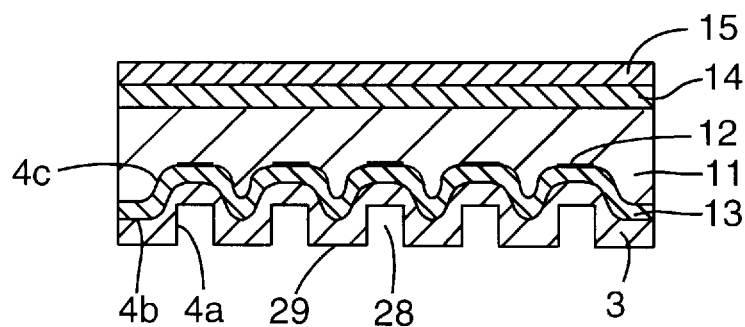
FIG. 2 is a fragmentary sectional perspective view of a decorative sheet provided with an overcoat in accordance with the present invention.
Figure 3:
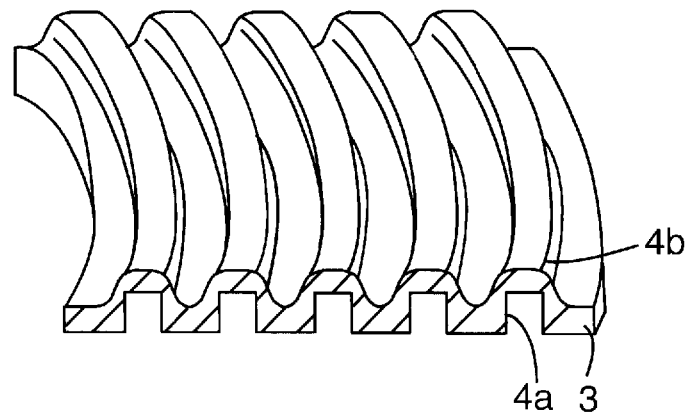
FIG. 3 is a perspective view of an embossed pattern consisting of parallel curves.
Figure 4A:
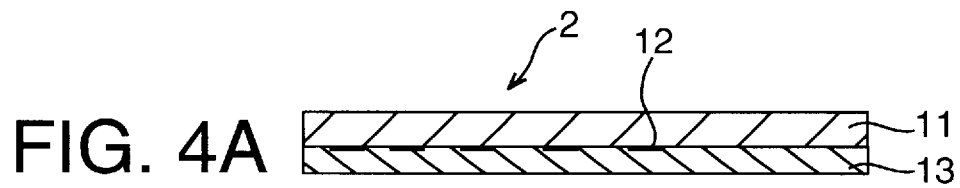
FIG. 4 is sectional view of a printed film and a colored thermoplastic resin film.
Figure 4B:
Figure 5:
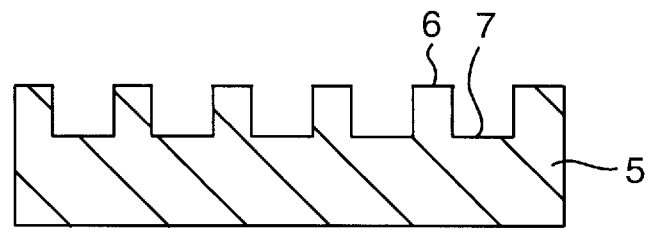
FIG. 5 is an enlarged sectional view of an embossing die.
Figure 6:
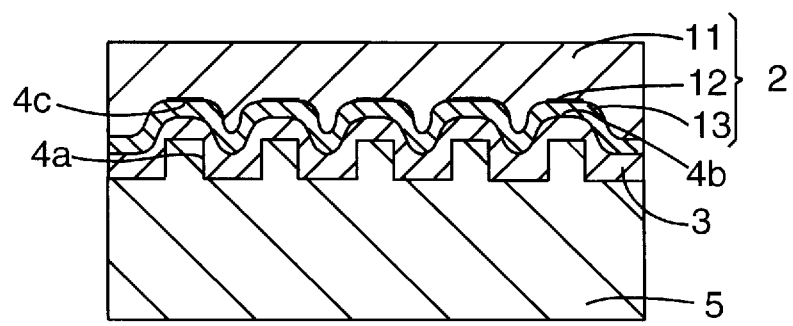
FIG. 6 is a typical sectional view of a printed film and a colored thermoplastic resin film embossed with the embossing die of FIG. 5.
Figure 7A:
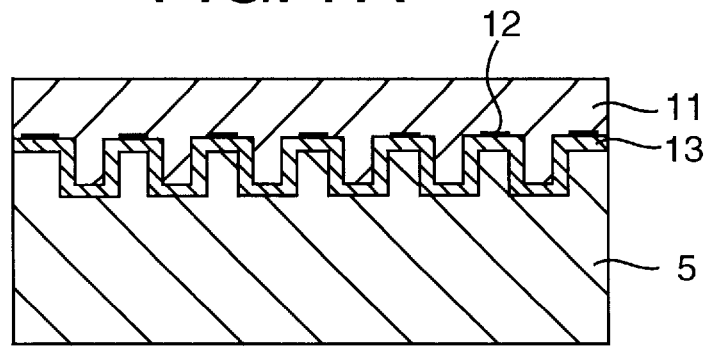
FIG. 7 is sectional view of a printed film embossed with the embossing die of FIG. 5.
Figure 7B:
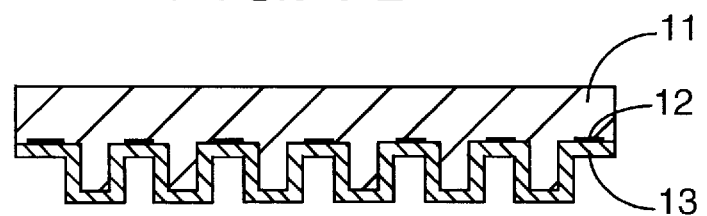
Figure 8:
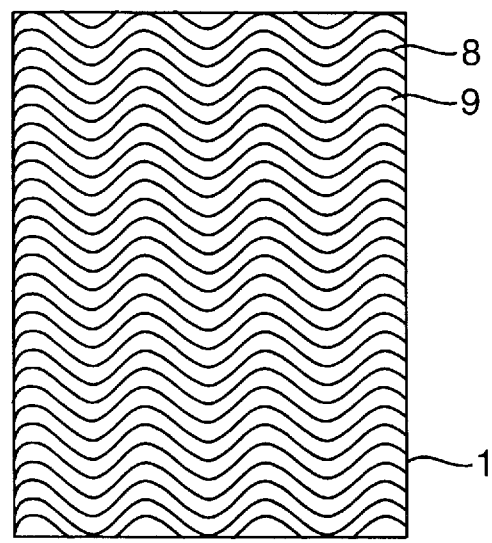
FIG. 8 is a plan view of a surface embossed with a pattern consisting of sinusoidal lines.
Figure 9A:
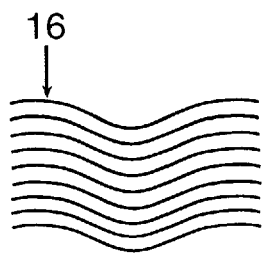
FIGS. 9A, 9B, 9C, 9D, and 9E are plan views of embossed patterns.
Figure 9B:
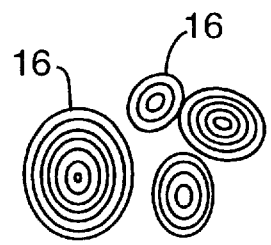
Figure 9C:
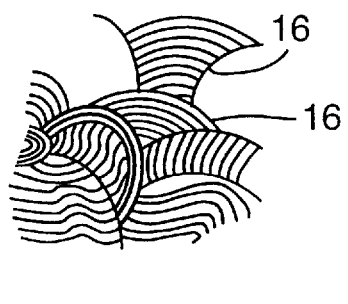
Figure 9D:
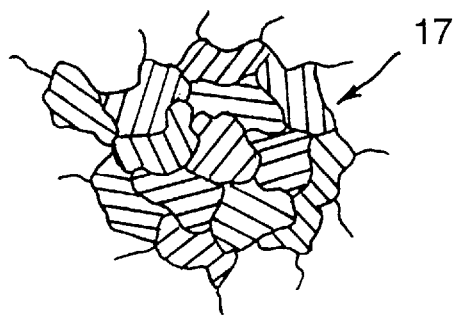
Figure 9E:
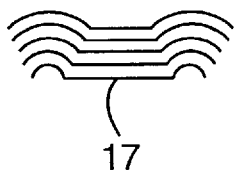
Figure 10A:
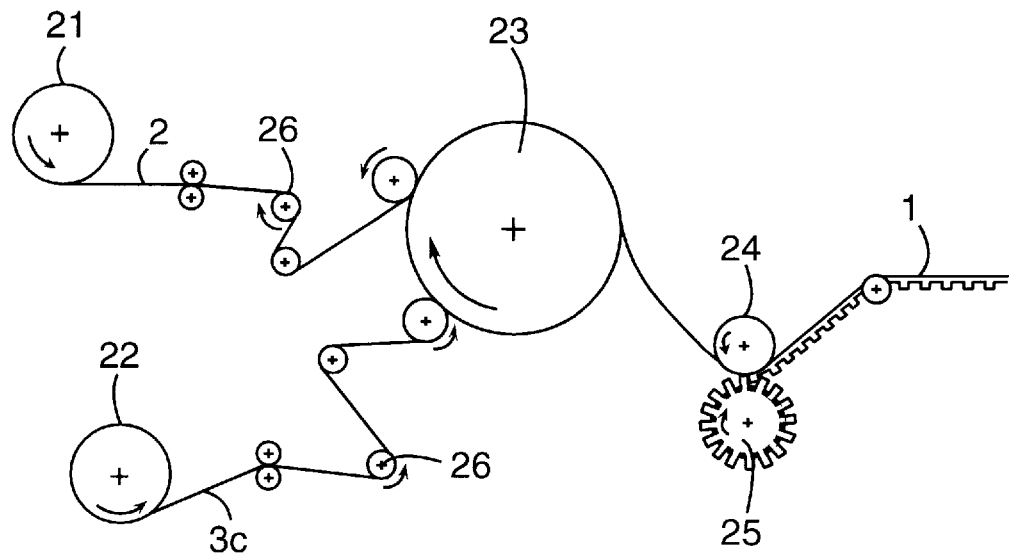
FIGS. 10A and 10B are diagrammatic views of a decorative sheet producing method in accordance with the present invention and an enlarged sectional view of an embossing mechanism shown in FIG. 10A, respectively.
Figure 10B:
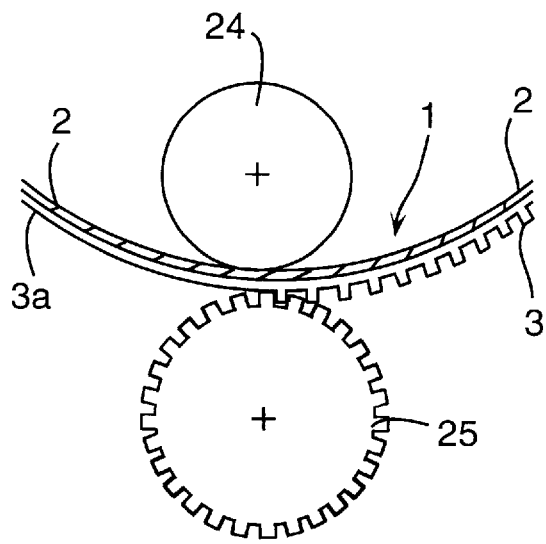
Figure 11A:
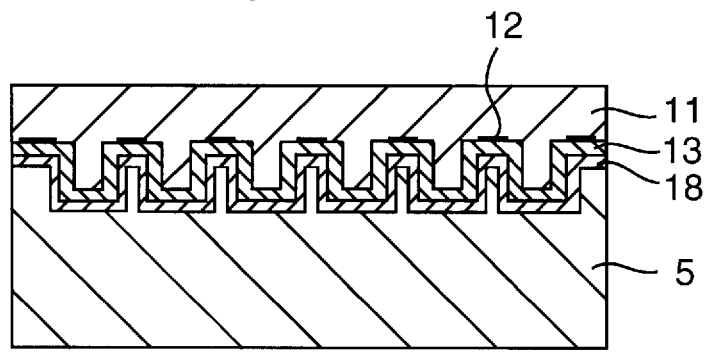
FIG. 11 is sectional view of comparative examples of embossed printed films.
Figure 11B:
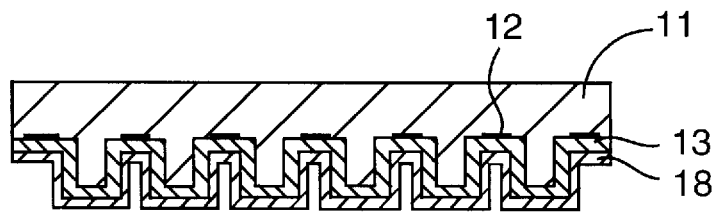

FIG. 1 is a sectional view of a decorative sheet in a first embodiment according to the present invention, FIG. 2 is a sectional view of a decorative sheet in a second embodiment according to the present invention produced by coating the surface of the decorative sheet of FIG. 1 with a transparent resin layer to improve abrasion resistance, chemical resistance and soil resistance, FIG. 3 is a fragmentary sectional perspective view of an embossed groove pattern consisting of parallel curves, FIG. 4(a) is a sectional view of a printed film formed by printing a printed woodgrain pattern and a lustrous solid printed layer on a transparent thermoplastic resin film, FIG. 4(b) is a sectional view of a colored thermoplastic resin film, FIG. 5 is a sectional view of an embossing die provided with a pattern of alternate, parallel, curved ridges and furrows, FIG. 6 is a typical sectional view of a structure produced by laminating the transparent printed film of FIG. 4(a) and the colored thermoplastic resin film of FIG. 4(b) by doubling embossing using the embossing die of FIG. 5, FIG. 7(a) is a sectional view of assistance in explaining an embossing process for embossing a transparent thermoplastic resin film provided with a printed woodgrain pattern and a printed lustrous solid printed layer with the embossing die of FIG. 5, FIG. 7(b) is a sectional view of an embossed pattern formed by the embossing process of FIG. 7(a), FIG. 8 is a plan view of a surface embossed with a pattern consisting of sinusoidal lines, FIGS. 9A to 9E are pictorial views of embossed patterns, FIG. 10A is a diagrammatic view of a decorative sheet fabricating method in accordance with the present invention, FIG. 10B is an enlarged sectional view of an embossing mechanism shown in FIG. 10A, respectively, FIGS. 11(a) and 11(b) are sectional views showing a comparative decorative sheet fabricating method.

Referring to FIG. 1, an embossed decorative sheet in a preferred embodiment according to the present invention comprises, as principal components, a transparent thermoplastic resin film 11, a printed woodgrain or fabric texture pattern 12, a lustrous solid printed layer 13, and a colored thermoplastic resin film 3 provided with a first embossed pattern 4a. A third embossed pattern 4c is formed in a interface visible from the front surface, i.e. the surface of the transparent thermoplastic resin film 11 on which the lustrous solid printed layer 13 is formed, and a second embossed pattern 4b is formed in the surface of the colored thermoplastic resin film 3 joined to the lustrous solid printed layer 13.

The cross section of each of the second embossed pattern 4b and the third embossed pattern 4c has a shape having rounded corners, and the outline of the cross section is a smooth curved line expressed by a periodic function or a pseudoperiodic function. There is no particular restriction on the shapes of the outlines of the second embossed pattern 4b and the third embossed pattern 4c. The outline of the cross section of each of the second embossed pattern 4b and the third embossed pattern 4c may be of a rounded rectangular pulse train, a rounded triangular pulse train, a rounded trapezoidal pulse train, a sinusoidal wave, a curve expressed by the Bessel function, a cycloid curve, a curve expressed by an elliptic function or a curve analogous with any one of those curves. A curve expressed by a pseudoperiodic function as mentioned herein is neither an accurately periodic curve nor a single-pulse curve, but a curve with periods distributed in a certain range, apparently analogous with a curve expressed by a periodic function, such as a curve obtained by the amplitude modulation, frequency modulation or phase modulation of a curve expressed by a periodic function or a curve resembling a curve represented by a phonetic signal. When need be, the surface of the transparent thermoplastic resin film 11 may be coated with an overcoat 14 and a UV-setting resin layer 15 as shown in FIG. 2 to enhance the abrasion resistance, chemical resistance and soil resistance of the decorative sheet 1.

When producing the decorative sheet 1, a printed film 2 is prepared by printing the printed woodgrain pattern 12 or a printed textural pattern, and the lustrous solid printed layer 13 on the transparent thermoplastic resin film 11.

Although it is possible to use an embossing die provided with ridges and furrows undulating in, for example, a sinusoidal curve and having a cross section with rounded corners for embossing and laminating the printed film 2 and the colored thermoplastic resin film 3, generally such an embossing die is difficult to make. Therefore, an embossing die 5 having alternate parallel curved ridges 6 and parallel curved furrows 7 as shown in FIG. 5, which is easy to make, is employed. As shown in FIG. 6, the printed film 2 and the colored thermoplastic resin film 3 are put together, and hot-pressed with the embossing die 5 on a press to laminate the printed film 2 and the colored thermoplastic resin film 3 by fusion and, at the same time, to form an embossed pattern by embossing the printed film 2 and the colored thermoplastic resin film 3 from the side of the colored thermoplastic resin film 3. The printed film 2 and the colored thermoplastic resin film 3 are compressed on the press for a predetermined time, and then the thus laminated printed film 2 and the colored thermoplastic resin film 3 are cooled to complete the embossed decorative sheet 1.

It is desirable that the thickness of the colored thermoplastic resin film 3 is in the range of one to five times the height of the ridges 6, i.e., the depth of the furrows 7, to form the second embossed pattern 4b and the third embossed pattern 4c, each having rounded protrusions and depressions, in the interface between the lustrous solid printed layer 13 and the colored thermoplastic resin film 3, and in the interface between the transparent thermoplastic resin film 11 and the lustrous solid printed layer 13, respectively.

Since a structure formed by superposing the printed film 2 having the the transparent thermoplastic resin 11, and the colored thermoplastic resin film 3 having the aforesaid thickness is embossed to produce the decorative sheet 1, the second embossed pattern 4b and the third embossed pattern 4c formed in the interface between the lustrous solid printed layer 13 and the colored thermoplastic resin film 3, and in the interface between the transparent thermoplastic resin film 11 of the printed film 2 and the lustrous solid printed layer 13, respectively, have each a cross section having an outline of a smooth curve resembling a rounded pulse train or expressed by a periodic function as shown in FIG. 1. When the embossing die 5 having the pattern of the rectangular ridges 6 and the rectangular furrows 7 as shown in FIG. 4 is used for embossing, the outer surface of the colored thermoplastic resin film 3 is deformed in a pattern complementary to the pattern of the embossing die 5, whereas the lustrous solid printed layer 13 is deformed in a pattern having a cross section of a smoothly undulating outline as shown in FIG. 6, because the colored thermoplastic resin film 3 has the aforesaid thickness. Thus, the second embossed pattern 4b formed in the interface between the lustrous solid printed layer 13 and the colored thermoplastic resin film 13 and the third embossed pattern 4c formed in the interface between the transparent thermoplastic resin film 11 and the lustrous solid printed layer 13 have each a cross section having the smoothly curved outline as shown in FIG. 6.

As shown in FIG. 3, each of the first embossed pattern 4a and the second embossed pattern 4b formed respectively in the opposite surfaces of the colored thermoplastic resin film 3 of the decorative sheet 1 consists of parallel curves, and the third embossed pattern 4c, similarly to the first embossed pattern 4a and the second embossed pattern 4b, consists of parallel curves. The second protrusions and depressions embossed pattern 4b and the third embossed pattern 4c defining the shape of the lustrous solid printed layer 13 sandwiched between the transparent thermoplastic resin film 11 and the colored thermoplastic resin film 3, and being visible from the side of the transparent thermoplastic resin film 11 have each a cross section of a smoothly curved outline defined by rounded protrusions and rounded rectangular depressions expressed by a periodic function, as shown in FIG. 3.

If the printed film 2 provided with the printed woodgrain pattern 12 and the bright solid layer 13 is embossed without joining the colored thermoplastic resin film 3 to the printed film 2, the ridges of the embossing die 5 deforms the lustrous solid printed layer 13 directly as shown in FIG. 7(*a*) and the very thin lustrous solid printed layer 13 of 10 μm or less in thickness forming the embossed surface of the decorative sheet 1 is deformed so that the lustrous solid printed layer 13 has a cross section having alternate rectangular protrusions and rectangular depressions as shown in FIG. 7(*b*). Thus, the lustrous solid printed layer 13 is unable to exhibit the luster of natural wood faithfully because the light reflecting mode of the embossed, lustrous solid printed layer 13 is different from that of the cell walls of natural wood.

The first embossed pattern 4a of protrusions and depressions formed in the back surface of the colored thermoplastic resin film 3 is formed by heating and pressing the superposed printed film 2 having the transparent thermoplastic resin 11, and the colored thermoplastic resin film 3 with the embossing die 5 having the shape of a plate or a roll. The respective widths of the protrusions 29 and the depressions 28 of the first embossed pattern 4a are in the range of 1 to 1000 μm, more preferably, 60 to 100 μm (FIGS. 1 and 2). The depressions 28 and the protrusions 29 may be the same or different from each other in width. The depth of the furrows 28 is in the range of 5 to 100 μm, more preferably, 20 to 35 μm.

Generally, the first embossed pattern 4a, the second embossed pattern 4b and the third embossed pattern 4c are formed by using the embossing die 5 provided with a pattern of alternate furrows 8 and ridges 9 undulating in a plane in the shape of a sinusoidal curve as shown in FIG. 8 to give the decorative sheet 1 a woodgrain luster. However, embossing dies provided respectively with a pattern of alternate parallel furrows and parallel ridges having the shape of a curve 16, a pattern of alternate parallel furrows and parallel ridges having the shape of a straight line 17 and a pattern of alternate parallel furrows and parallel ridges having the shape of a combination of the curve 16 and the straight line 17 may be used, as show in in FIGS. 9A–9E.

In the decorative sheet 1, the second embossed pattern 4b in the interface between the lustrous solid printed layer 13 and the colored thermoplastic resin film 3, and the third embossed pattern 4c in the interface between the transparent thermoplastic resin film 11 and the lustrous solid printed layer 13 have each a cross section having an outline defined by alternate protrusions having rounded corners and depressions having rounded corners, expressed by a periodic function or a pseudoperiodic function. Since the protrusions and the depressions of the second embossed pattern 4b and the third embossed pattern 4c are similar to the cell walls of natural wood, the light scattering effect of the lustrous solid printed layer 13 is similar to that of natural wood, and therefore, the decorative sheet 1 has an elegant solid woodgrain appearance and a luster resembling that of natural wood.

The embossing die 5 employed for producing the decorative sheet 1 must have a pattern of the parallel ridges 6 and the parallel furrows 7. The embossing die 5 may have the shape of either a plate or a roll. The ridges 6 and the furrows 7 may be formed by a known engraving process or a known chemical etching process. The respective widths of the ridges 6 and the furrows 7 may be in the range of 1 to 1000 μm, preferably, 60 to 100 μm, more preferably on the order of 80 μm. The preferable depth of the furrows 7 is in the range of 20 to 35 μm. The respective widths of the ridges 6 and the furrows 7 may be the same or different from each other provided that the widths range between 60 and 100 μm. The ridges 6 of the embossing die 5, having a thickness less than 60 μm are unable to form depressions having a depth large enough to give an effective luster to the decorative sheet 1. The embossed patterns 4a, 4b, 4c formed by using an embossing die having ridges 6 of a width not less than 100 μm appears on the pictorial pattern (printed woodgrain pattern) 12 of the decorative sheet 1 to spoil the design of the decorative sheet 1.

When the respective widths of the ridges 6 and the furrows 7 are 80 μm and the depth of the furrows 7 is 35 μm, the depth of the depressions 28 formed in the first embossed pattern 4a of the decorative sheet 1 is 28 μm, which is large enough to give an effective luster to the decorative sheet 1. When the respective widths of the ridges 6 and the furrows 7 of the embossing die 5 were 50 μm and the depth of the furrow 7 was 35 μm, the depth of the depressions 28 formed in the first embossed pattern 4a of the decorative sheet 1 was as small as 18 μm, the depth of the depressions in the second and third embossed patterns 4b, 4c was less than 18 μm, and the embossed patterns 4a, 4b, 4c was unable to give an effective luster to the decorative sheet 1.

Generally, the transparent thermoplastic resin film 11 of the decorative sheet 1 is a polyvinyl chloride film. An acrylic film, a polyolefine film, a polyester film, a polyvinylidene chloride film, a polystyrene film, a polycarbonate film, a polyvinyl alcohol film, a polyamide film or such may be used as the transparent thermoplastic resin film 11. The preferable thickness of the transparent thermoplastic resin film is in the range of 50 to 200 μm.

The colored thermoplastic resin film 3 is formed by extruding or casting or other methods a thermoplastic resin containing a mixture of titanium oxide powder, carbon black powder, red oxide powder, a pigment, dyes and/or a filler in a film.

The thickness of the colored thermoplastic resin film 3, against which the embossing die 5 is pressed directly, must be determined so that the shapes of the ridges 6 having sharp edges and the furrows 7 having sharp corners of the embossing die 5 are not transferred faithfully to the printed film 2 and so that the lustrous solid printed layer 13 in contact with the surface of the colored thermoplastic resin film 3 is deformed to form the second embossed pattern 4b of alternate protrusions having rounded edges and depressions having rounded corners. The thickness of the colored thermoplastic film 3 must be equal to or greater than the height of the ridges 6, i.e., the depth of the furrows 7, of the embossing die 5 not to transfer the shapes of the ridges and the furrows of the embossing die 5 faithfully to the lustrous solid printed layer 13, and it is preferable that the thickness of the colored thermoplastic resin film 3 is five times or below the height of the ridges 6, i.e., the depth of the furrows 7, of the embossing die 5 to emboss the colored thermoplastic resin film 3 satisfactorily so that a luster resembling that of natural wood is given to the decorative sheet 1.

A textural printed pattern may be used instead of the printed woodgrain pattern 12. The printed woodgrain pattern 12 is formed by gravure printing or the like. An ink for forming the printed woodgrain pattern 12 by gravure printing is prepared by blending a vehicle, such as a vinyl resin, an acrylic resin, a nitrocellulose resin, an aminoalkyd resin, butiryl resin or the like, a pigment, an ink and other necessary materials.

The lustrous solid printed layer 13 is formed by solid printing using an ink containing a lustrous pigment 13a (FIG. 12). A bright printed pattern layer or a metal thin film formed by vacuum evaporation or sputtering may be used instead of the lustrous solid printed layer 13. Generally, the lustrous pigment 13a is a mice pigment produced by coating mica particles with titanium dioxide, metal powder, such as aluminum powder, or pearl essence having a pearly luster.

The overcoat 14 is formed to enhance the abrasion resistance, the chemical resistance and the soil resistance of the decorative sheet 1. The overcoat 14 is formed of a transparent resin excellent in abrasion resistance, chemical resistance and soil resistance, generally, a polyurethane resin, by gravure printing or coating. The suitable thickness of the overcoat 14 is in the range of 3 to 4 $\mu$m. In some cases, the decorative sheet 1 is provided with a ultraviolet cured (crosslinked or polymerized) acrylic resin layer 15 to enhance the scratch resistance thereof.

Next, the lustrous solid printed layer 13 is in detail described in FIG. 12(a)–(d). The lustrous solid printed layer 13 is formed by solid printing using the ink containing the lustrous pigment 13a and a thermoplastic resin binder, as mentioned above.

In FIG. 12(a)–(d), when the printed film 2 and the colored thermoplastic resin film 3 are laminated and embossed, the dispersion ratio of the lustrous pigment 13a within the lustrous solid printed layer 13 varies in accordance with the position of the embossing die 5. As a result, the luster of the decorative sheet 1 varies very much according to the orientation of the surface of the decorative sheet 1 relative to the light source or the direction of view, and therefore the luster of the decorative sheet 1 can more precisely resemble that of natural wood or fabric texture.

Figure 12A:
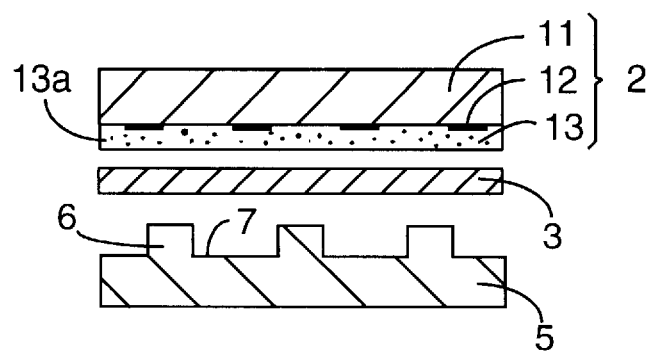
FIGS. 12A–12D are sectional views of the decorative sheet showing distribution ratio of a lustrous pigment within a bright layer.
Figure 12B:
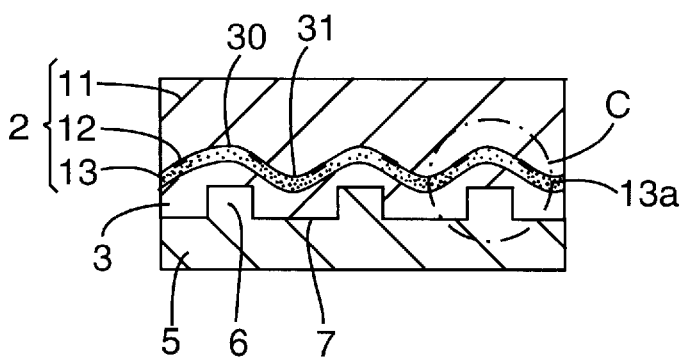
Figure 12C:
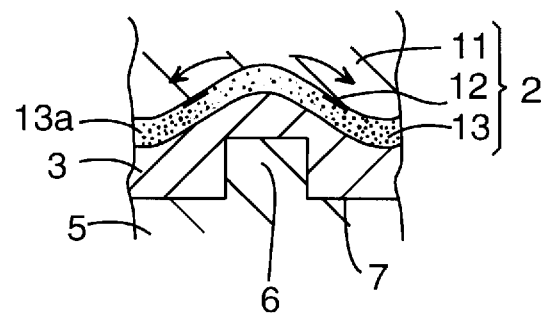

That is, first, the transparent thermoplastic resin film 1 having the printed pictorial pattern 12, the lustrous solid printed layer 13, and the colored thermoplastic resin film 3 are superposed in this order, heated and pressed by the embossing die 5 (embossing plate) having the ridges 6 and the furrows 7 (FIG. 12(a)).

In this case, the lustrous solid printed layer 13 is strongly pressed at the portion 30 thereof corresponding to the ridges 6, and therefore the softened thermoplastic resin binder of the portion 30 flows from the ridge side to the furrow side. With the flow of the thermoplastic resin binder, the lustrous pigment 13a of the lustrous solid printed layer 13 flows to the furrow side (FIG. 12(b) (c)).

As a result, the dispersion ratio of the lustrous pigment 13a within the lustrous solid printed layer 13 becomes relatively low (sparse) at the portion 30 of the layer 13 corresponding to the ridges 6 (or to the depressions 28), while the dispersion ratio of the lustrous pigment 13a becomes relatively high (dense) at the portion of the layer 13 corresponding to the furrows 7 (or to the protrusions 29).

Figure 12D:
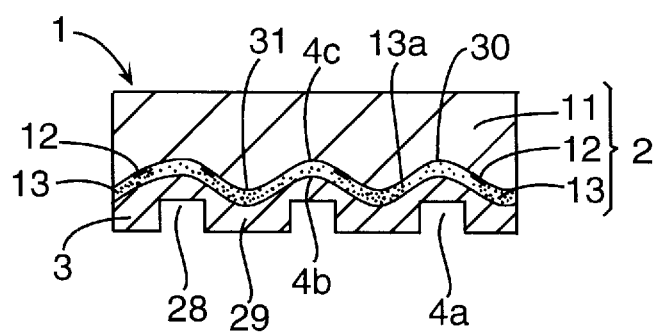

Next, the embossing die 5 is removed from the colored thermoplastic resin film 3 (FIG. 12(d)).

As the dispersion ratio of the lustrous pigment 13a within the lustrous solid printed layer 13 is modulated in accordance with the ridges 6 or the furrows 7 of the die 7 in this way, the luster of the decorative sheet 1 which varies according to the orientation of the surface relative to the light source or the direction of view, becomes brighter at the portion 31 of the lustrous solid printed layer 13 having the denser pigment 13a, and becomes darker at the portion 30 of the lustrous solid printed layer 13 having the sparser pigment 13a.

In addition, as the brightness of the luster of the decorative sheet is effected not only by the dispersion ratio of the lustrous pigment 13a but also by the second and third embossed patterns 4b, 4c having protrusions and depressions located according to the dispersion ratio of the lustrous pigment 13a, the luster of the decorative sheet can more effectively resemble that of the natural wood because of the multiplier effect of the location of the protrusions and depressions of the second and third embossed patterns 4b, 4c, and the dispersion ratio of the lustrous pigment 13a.

Incidentally, polyvinyl acetate, vinyl chloride-vinyl-acetate copolymer, polymethyl methacrylate, polybutyl methacrylate, polymethyl acrylate, and polybutyl acrylate can be preferably used as the thermoplastic resin binder of the lustrous solid printed layer 13.

EXAMPLE

A printed film 2 as shown in FIG. 4(a) was made by forming a printed woodgrain pattern 12, i.e., a pattern of the edge grain of a Japanese cedar in this example, on the back surface of a 100 $\mu$m thick polyvinyl chloride film (Riken Biniru K.K., 100 parts by weight resin and 12 parts by weight plasticizer) by gravure printing and forming a lustrous solid printed layer 13 over the printed woodgrain pattern 12 by gravure printing using a gravure provided with a depressed area of 60 $\mu$m in depth and a bright ink (Showa Inku K.K.) prepared by dispersing pearl essence produced by coating mica particles of 15 $\mu$m in average particle size with titanium dioxide in an ink containing a binder prepared by mixing a copolymer of vinyl chloride and vinyl acetate, and an acrylic resin, and then the printed film 2 was taken up in a roll 21.

Then, as shown in FIG. 10A, the printed film 2 was unwound from the roll 21, and a 60 $\mu$m thick colored polyvinyl chloride film 3a (Riken Biniru K.K., 100 parts by weight resin and 12 parts by weight plasticizer) was unwound from a roll 22, the printed film 2 and the colored polyvinyl chloride film 3a were preheated with a preheating rollers 26, the printed film 2 and the polyvinyl chloride film 3a were laminated on a heating drum 23 into a laminated sheet, and then the laminated sheet was embossed from the side of the colored polyvinyl chloride film 3a with an embossing roller 25 provided with an embossing pattern of sinusoidal ridges and sinusoidal furrows, while the laminated sheet was heated at 160° C., the embossing roller 25 was heated at a surface temperature of 60° C. and the laminated structure was fed at a feed speed of 10 m/min. Thus, an embossed pattern was formed in the colored polyvinyl chloride film 3a as shown in FIG. 10B to obtain a decorative sheet 1. In the embossing roller 25, the width of the sinusoidal furrows was 80 μm, the width of the sinusoidal ridges between the adjacent sinusoidal furrows was 80 μm and the depth of the sinusoidal furrows was 35 μm. The shapes of the respective cross sections of each ridge and each furrow of the embossing roller 25 were rectangular.

The decorative sheet 1 thus produced had a cross section as shown in FIG. 1. An overcoat 14 of an ink containing a two-component polyurethane resin (OP-81, Showa Inku K.K.) was formed over the transparent polyvinyl chloride film 11 of the decorative sheet 1 by solid gravure printing. In some cases, a UV-setting resin layer 15 is formed over the surface of the overcoat 14 to enhance the scratch resistance of the decorative sheet 1. In some cases, a resin layer is formed between the lustrous solid printed layer 13 and the colored polyvinyl chloride resin film 3a to improve the adhesion between the lustrous solid printed layer 13 and the colored polyvinyl chloride resin film 3a.

In the decorative sheet 1 thus produced, a third embossed pattern like the third embossed pattern 4c, and a second embossed pattern like the second embossed pattern 4b were formed in the interface between the transparent thermoplastic resin film 11 and the lustrous solid printed layer 13 and in the interface between the lustrous solid printed layer 13 and the colored thermoplastic resin film 3, respectively. The embossed patterns 4b, 4c had each a cross section consisting of alternate protrusions having rounded corners and depressions having rounded corners like those shown in FIG. 1. The decorative sheet 1 had a solid luster resembling that of natural wood, and a realistic, elegant woodgrain appearance.

COMPARATIVE EXAMPLE

A printed film 2 having a lustrous solid printed layer 13 was produced by the same process as that employed in producing the printed film 2 of the example, and then 2 μm thick brown solid printed layer 18 was formed over the lustrous solid printed layer 13 by gravure printing. Then, the printed film 2 coated with the brown solid printed layer 18 was embossed directly from the side of the brown solid printed layer 18 to form an embossed pattern as shown in FIG. 11(a) by the same process as that carried out in the foregoing example and with an embossing die 5 provided with an embossing pattern of sinusoidal ridges 6 and sinusoidal furrows 7, which were the same in shape and dimensions as the embossing pattern employed in the foregoing example. Embossed patterns formed in the interfaces between the transparent thermoplastic resin film 11 and the lustrous solid printed layer 13 and between the lustrous solid printed layer 13 and the brown solid printed layer 18 of a decorative sheet 1 thus produced had each a cross section consisting of alternate rectangular protrusions having edged corners and rectangular depressions having edged corners as shown in FIG. 11(b). The brightness of the surface of the decorative sheet 1 was somewhat higher than that of natural wood and rather unnatural, and the decorative sheet 1 had an insufficient luster.

As is apparent from the foregoing description, the present invention gives a decorative sheet an excellent design and a solid luster comparable to that of natural wood, and provides a decorative sheet having a realistic, elegant, woodgrain appearance.

When the decorative sheet is provided with a sinusoidal embossed pattern of sinusoidal waves extending along a direction perpendicular to the orientation of the printed woodgrain pattern, the luster varies according to the orientation of the surface of the decorative sheet relative to the light source or the direction of view.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A decorative sheet, comprising:

a transparent thermoplastic resin film having a back surface provided with a printed pictorial pattern;

a lustrous layer having a back surface, said lustrous layer being formed on the back surface of the transparent thermoplastic resin film; and a colored thermoplastic resin film having a back surface, said colored thermoplastic resin film being formed on the back surface of the lustrous layer, wherein a first, a second and a third embossed pattern are formed in the back surface of the colored thermoplastic resin film, in an interface between the colored thermoplastic resin film and the lustrous layer, and in an interface between the lustrous layer and the transparent thermoplastic resin film, respectively, and wherein respective outlines of cross sections of the second and the third embossed patterns formed respectively in the interface between the colored thermoplastic resin film and the lustrous layer and in the interface between the lustrous layer and the transparent thermoplastic resin film are composed of smooth curves expressed by periodic functions.

2. A decorative sheet according to claim 1, wherein the respective cross sections of the second and the third embossed patterns formed respectively in the interface between the colored thermoplastic resin film and the lustrous layer and in the interface between the lustrous layer and the transparent thermoplastic resin film are substantially parallel to each other.

3. A decorative sheet according to claim 2, wherein the position of the first embossed pattern formed in the back surface of the colored thermoplastic resin film corresponds to those of the second and the third embossed patterns formed, respectively, in the interface between the colored thermoplastic resin film and the lustrous layer and in the interface between the lustrous layer and the transparent thermoplastic resin layer.

4. A decorative sheet according to claim 3, wherein the first embossed pattern formed in the back surface of the colored thermoplastic resin film comprises curved protrusions, and curved depressions formed between the adjacent curved protrusions, and wherein respective cross sections of the protrusions and depressions are rectangular.

5. A decorative sheet according to claim 1, further comprising an overcoat coating an exposed surface of the transparent thermoplastic resin film.

6. A decorative sheet according to claim 5, further comprising an ultraviolet cured resin layer coating an exposed surface of the overcoat.

7. A decorative sheet according to claim 1, wherein each of the first, the second and the third embossed patterns is composed of an arrangement of at least one of parallel curves and parallel straight lines.

8. A decorative sheet according to claim 1, wherein said first embossed pattern has protrusions and depressions, and wherein said lustrous layer includes a lustrous pigment having a denser dispersion ratio at a portion of said lustrous layer corresponding to said protrusions, and a sparser dispersion ratio at a portion of said lustrous layer corresponding to said depressions.

9. A decorative sheet producing method, comprising the steps of:

sequentially forming a printed pictorial pattern and a bright layer on a back surface of a transparent thermoplastic resin film;

superposing a colored thermoplastic resin film on an exposed surface of the bright layer; and simultaneously forming a first embossed pattern in an exposed surface of the colored thermoplastic resin film, and second and third embossed patterns, each having a cross section having a smooth curved outline expressed by a periodic function, in the interfaces between the colored thermoplastic resin film and the bright layer and between the bright layer and the transparent thermoplastic resin film, respectively, with an embossing die plate.

10. A decorative sheet producing method according to claim 9, wherein the step of superposing the colored thermoplastic resin film on the exposed surface of the bright layer, and the step of forming the first, the second and the third embossed patterns are carried out substantially simultaneously.

11. A decorative sheet producing method according to claim 9, wherein the embossing die plate is provided with a pattern of alternative ridges and furrows each having rectangular cross sections.

* * * * *